US011662877B2

(12) United States Patent
Mizukami et al.

(10) Patent No.: US 11,662,877 B2
(45) Date of Patent: *May 30, 2023

(54) IMAGE DISTRIBUTION METHOD, IMAGE DISTRIBUTION SERVER DEVICE AND CHAT SYSTEM

(71) Applicant: GREE, INC., Tokyo (JP)

(72) Inventors: Gaku Mizukami, Tokyo (JP); Ryohei Yoshikawa, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,445

(22) Filed: Oct. 22, 2021

(65) Prior Publication Data

US 2022/0043556 A1 Feb. 10, 2022

Related U.S. Application Data

(63) Continuation of application No. 14/436,353, filed as application No. PCT/JP2013/078122 on Oct. 17, 2013, now Pat. No. 11,169,655.

(30) Foreign Application Priority Data

Oct. 19, 2012 (JP) .................................. 2012-232185
May 9, 2013 (JP) .................................. 2013-099641

(51) Int. Cl.
*G06F 3/04815* (2022.01)
*H04N 7/15* (2006.01)
(Continued)

(52) U.S. Cl.
CPC ...... *G06F 3/04815* (2013.01); *H04L 12/1827* (2013.01); *H04L 51/04* (2013.01);
(Continued)

(58) Field of Classification Search
None
See application file for complete search history.

(56) References Cited

U.S. PATENT DOCUMENTS 5,953,451 A 9/1999 Syeda-Mahmood
5,963,217 A 10/1999 Grayson et al.
(Continued)

FOREIGN PATENT DOCUMENTS

JP 2002-251365 A 9/2002
JP 2002-278904 A 9/2002
(Continued)

OTHER PUBLICATIONS

Office Action dated Apr. 16, 2013 in corresponding Japanese Patent Application No. 2012-232185 with English Translation.
(Continued)

*Primary Examiner* — Stella Higgs
(74) *Attorney, Agent, or Firm* — Oliff PLC

(57) ABSTRACT

An image distribution device receives, from a terminal device, a handwritten and input image including a trajectory handwritten and inputted by a first user in a state where a virtual space, in which characters of the first and a second user are present, is set as a background, to a display view of the terminal device on which the virtual space is displayed. By transmitting, to the terminal device, the received handwritten and input image as a message from the first user, the image distribution device displays the handwritten and input image on the display view of the terminal device on which the virtual space is displayed while associating the handwritten and input image with the character of the first user.

12 Claims, 5 Drawing Sheets

(51) Int. Cl.
*H04L 51/04* (2022.01)
*H04L 12/18* (2006.01)
*H04L 51/52* (2022.01)
*H04L 51/046* (2022.01)
*H04L 51/10* (2022.01)
*H04N 21/4788* (2011.01)

(52) U.S. Cl.
CPC ............ *H04L 51/046* (2013.01); *H04L 51/52* (2022.05); *H04N 7/157* (2013.01); *H04L 51/10* (2013.01); *H04N 21/4788* (2013.01)

(56) References Cited

U.S. PATENT DOCUMENTS

| | | |
|---|---|---|
| 6,304,898 B1 | 10/2001 | Shiigi |
| 6,339,431 B1 | 1/2002 | Ohmori et al. |
| 6,772,195 B1 | 8/2004 | Hatlelid et al. |
| 6,784,901 B1 * | 8/2004 | Harvey .................. H04L 67/02 715/848 |
| 7,007,065 B2 | 2/2006 | Matsuda |
| 7,032,011 B2 | 4/2006 | Woodard et al. |
| 7,894,836 B1 | 2/2011 | Fuoss et al. |
| 7,966,368 B2 | 6/2011 | Su et al. |
| 8,054,971 B2 | 11/2011 | Weiner |
| 8,375,397 B1 * | 2/2013 | Mendes da Costa ........................ H04L 65/403 719/310 |
| 8,634,712 B1 | 1/2014 | Mullins et al. |
| 2001/0048436 A1 | 12/2001 | Sanger |
| 2002/0046249 A1 | 4/2002 | Shiigi |
| 2002/0097267 A1 | 7/2002 | Dinan et al. |
| 2003/0163525 A1 | 8/2003 | Hendriks et al. |
| 2003/0195976 A1 | 10/2003 | Shiigi |
| 2004/0111479 A1 | 6/2004 | Borden et al. |
| 2005/0216568 A1 | 9/2005 | Walkush et al. |
| 2006/0041848 A1 * | 2/2006 | Lira ..................... G06Q 10/107 715/805 |
| 2007/0002057 A1 | 1/2007 | Danzig et al. |
| 2008/0045184 A1 | 2/2008 | Randall et al. |
| 2008/0059198 A1 | 3/2008 | Maislos et al. |
| 2008/0059570 A1 | 3/2008 | Bill |
| 2008/0214214 A1 | 9/2008 | Reissmueller et al. |
| 2008/0229186 A1 | 9/2008 | Gear et al. |
| 2009/0027480 A1 | 1/2009 | Choi |
| 2009/0198664 A1 | 8/2009 | Hamilton, II et al. |
| 2009/0199275 A1 | 8/2009 | Brock et al. |
| 2009/0307614 A1 | 12/2009 | Craig et al. |
| 2010/0138756 A1 | 6/2010 | Saund et al. |
| 2010/0205537 A1 | 8/2010 | Knighton et al. |
| 2011/0096235 A1 | 4/2011 | Chang et al. |
| 2011/0131041 A1 | 6/2011 | Cortez et al. |
| 2011/0273474 A1 * | 11/2011 | Iwayama ........... H04N 5/23219 345/636 |
| 2011/0276901 A1 | 11/2011 | Zambetti et al. |
| 2011/0276904 A1 | 11/2011 | Mehin et al. |
| 2012/0011454 A1 | 1/2012 | Droz et al. |
| 2012/0166968 A1 | 6/2012 | Lee et al. |
| 2012/0270578 A1 | 10/2012 | Feghali |
| 2012/0281020 A1 | 11/2012 | Yamamoto et al. |
| 2013/0162606 A1 | 6/2013 | Araumi |
| 2013/0290840 A1 | 10/2013 | Ogishi et al. |
| 2014/0331149 A1 | 11/2014 | Labey |
| 2015/0334257 A1 | 11/2015 | Woods et al. |

FOREIGN PATENT DOCUMENTS

| | | |
|---|---|---|
| JP | 2003-164669 A | 6/2003 |
| JP | 2003-179840 A | 6/2003 |
| JP | 2004-151966 A | 5/2004 |
| JP | 2005-100053 A | 4/2005 |
| JP | 2005-250651 A | 9/2005 |
| JP | 2009-301404 A | 12/2009 |
| JP | 2010-057127 A | 3/2010 |
| WO | 2009/100338 A2 | 8/2009 |
| WO | 2010/086991 A1 | 8/2010 |

OTHER PUBLICATIONS

Office Action dated Oct. 21, 2014 in corresponding Japanese Patent Application No. 2013-099641 with EnglishTranslation.
Office Action dated Aug. 18, 2015 in Japanese Patent Application No. 2015-116825 (with English language translation).
English translation of the International Preliminary Report on Patentability and Written Opinion dated Apr. 21, 2015 in PCT/JP2013/078122.
International Search Report dated Nov. 12, 2013 in PCT/JP2013/078122 filed Oct. 17, 2013.

* cited by examiner

IMAGE DISTRIBUTION METHOD, IMAGE DISTRIBUTION SERVER DEVICE AND CHAT SYSTEM

CROSS-REFERENCE TO RELATED APPLICATION(S)

This application is a continuation of U.S. application Ser. No. 14/436,353 filed Aug. 16, 2015, which is a National Stage of PCT/JP2013/078122 filed on Oct. 17, 2013 and which claims priority to Japanese Patent Application No. 2013-099641 filed on May 9, 2013 and Japanese Patent Application No. 2012-232185 filed on Oct. 19, 2012. The entire contents of the above applications are incorporated herein by reference.

The present invention relates to an image distribution method, an image distribution server device, and a chat system.

BACKGROUND

Conventionally, in the field of social networking services (SNS) and the like, characters of users have been used as various communication tools. In this case, a user creates a character (avatar) that represents himself/herself in a virtual world, and the character is displayed on a terminal of the user and terminal devices of other users.

In recent years, chat systems have been used in which multiple users can chat with each other via characters created by the respective users (hereinafter, referred to as the "characters of the users").

With this, the characters of the multiple users are placed in a particular virtual space (chat room) displayed on a terminal device (such as a smartphone or the like), which is used by each of the users. After that, since texts input with use of, for example, a keyboard or the like are displayed in the vicinity of the characters, the users can chat with each other as if the characters were holding a conversation.

PRIOR ART DOCUMENTS

Patent Documents

Patent Document 1: Japanese Laid-Open Patent Publication No. 2003-164669
Patent Document 2: Japanese Laid-Open Patent Publication No. 2009-301404

SUMMARY

As described above, chats through the respective characters of the users are generally made by texts input with use of keyboards or the like.

However, only with texts input with use of keyboards or the like, information to be communicated to other users is limited. Therefore, a freer mode of chatting is preferable.

An objective of the present invention is to provide an image distribution method, an image distribution server device, and a chat system enabling users to chat by handwriting.

In accordance with one aspect of the present invention, an image distribution method is provided that is executed by an image distribution server device connected to first and second terminal devices that are respectively used by first and second users who chat in a virtual space in which a character of the first user and a character of the second user are present. The image distribution method includes: a step for receiving, from the first terminal device, a handwritten and input image including a trajectory handwritten and input by the first user to a display view of the first terminal device, on which the virtual space is displayed, in a state where the virtual space is set as a background; and a step for, by sending the received handwritten and input image to the second terminal device as a message of the first user, displaying the handwritten and input image on a display view of the second terminal device, on which the virtual space is displayed, in association with the character of the first user.

The present invention enables users to chat by handwriting.

DETAILED DESCRIPTION OF THE PREFERRED EMBODIMENTS

One embodiment of the present invention will now be described with reference to the drawings.

Figure 1:
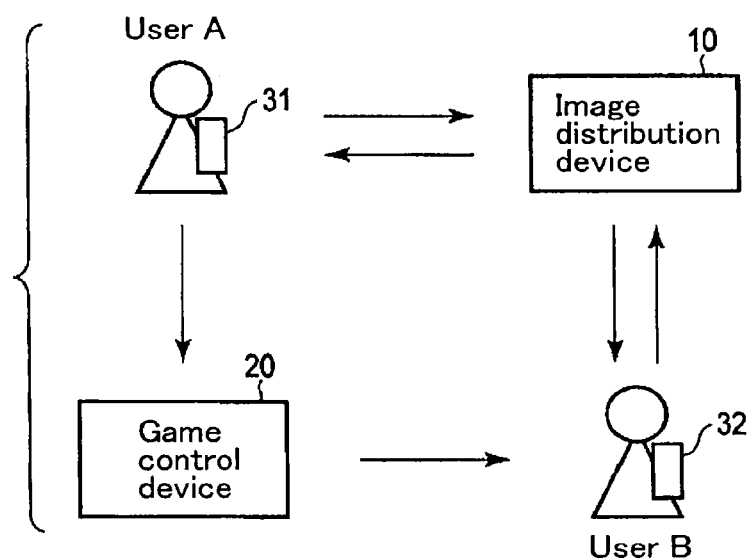
FIG. 1 is a diagram showing the configuration of a chat system according to one embodiment of the present invention.

FIG. 1 shows the configuration of a chat system according to the present embodiment. This chat system includes an image distribution device 10 and a game control device 20 (together, referred to as an image distribution server device), and a plurality of terminal devices used by a plurality of users.

The image distribution device 10 and the game control device 20 are connected via, for example, the terminal devices and a network. The terminal devices include a terminal device 31 (first terminal device) and a terminal device 32 (second terminal device). The terminal device 31 is used by, for example, a user A. Meanwhile, the terminal device 32 is used by, for example, a user B. In the present embodiment, (the terminal devices including) the terminal device 31 and the terminal device 32 are, for example, smartphones each including a touch panel. In FIG. 1, the terminal devices other than the terminal device 31 and the terminal device 32 are not shown.

In the present embodiment, the image distribution device 10, the game control device 20, the terminal device 31, and the terminal device 32 shown in FIG. 1 are realized as a hardware configuration for respectively realizing respective functions of the devices or a combination configuration of hardware and software. The software includes programs that are preliminarily installed from a storage medium or the network to have the devices realize the respective functions.

The chat system shown in FIG. 1 has a function of realizing, for example, a chat between the user A, who uses the terminal device 31, and (a plurality of users including) the user B, who uses the terminal device 32. Specifically, in the chat system shown in FIG. 1, a chat is made via, for example, a virtual space (hereinafter, referred to as the chat room), in which characters (avatars) of the user A and the user B are present. That is, on the terminal device 31 and the terminal device 32, the chat room in which the characters of the user A and the user B are present is displayed. The user A and the user B can chat on display views of the terminal device 31 and the terminal device 32.

Next, with reference to FIGS. 2 and 3, the image distribution device 10 and the game control device 20 provided in the chat system according to the present embodiment will be described.

Figure 2:
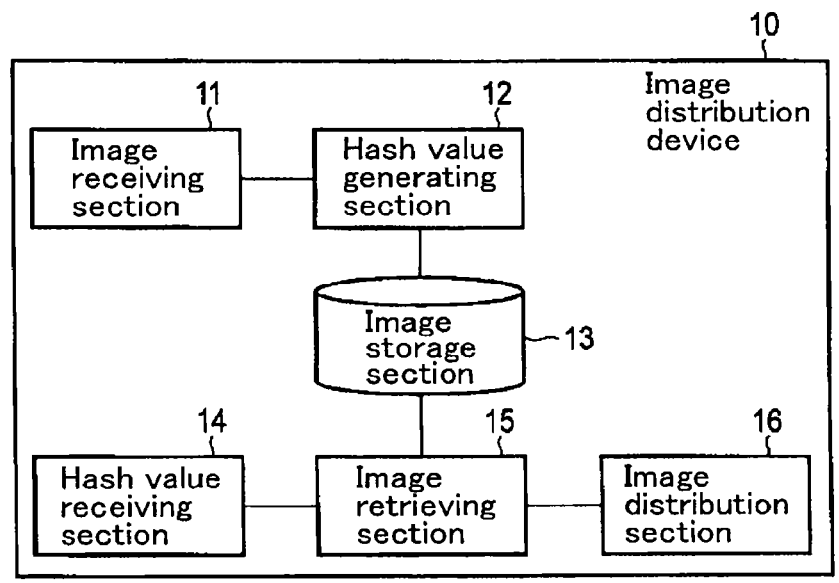
FIG. 2 is a block diagram mainly showing the functional configuration of the image distribution device 10 shown in FIG. 1.

FIG. 2 is a block diagram mainly showing the functional configuration of the image distribution device 10 shown in FIG. 1. The image distribution device 10 includes an image receiving section 11, a hash value generation section 12, an image storage section 13, a hash value receiving section 14, an image retrieving section 15, and an image distribution section 16.

The image receiving section 11 receives, from the terminal device 31, for example, an image including a trajectory handwritten and input on the display view of the terminal device 31 by the user A. For example, the user A, who uses the terminal device 31, can create a message of the user A to the user B (comment of the character of the user A) on the display view of the terminal device 31 during a chat with the user B, who uses the terminal device 32. Specifically, the user A can create a handwritten message on the display view of the terminal device 31 with use of the touch panel of the terminal device 31. The messages that can be created by handwriting include, for example, texts, drawings, symbols, paintings, and the like.

In a case where a message is created on the display view of the terminal device 31, the image receiving section 11 receives the image including the trajectory (that is, the message) handwritten and input to the display view of the terminal device 31 by the user A (hereinafter, referred to as the handwritten and input image)) from the terminal device 31.

The hash value generation section 12 generates identifying information unique to the handwritten and input image received by the image receiving section 11.

Specifically, the hash value generation section 12 generates a hash value of the handwritten and input image based on a hash function prepared in advance.

The hash value of the handwritten and input image generated by the hash value generation section 12 is sent to the terminal device 31, which has originally sent the handwritten and input image. The hash value generated by the hash value generation section 12 is sent to the terminal device 32 used by the user B, who is chatting with the user A, who uses the terminal device 31, via the game control device 20 as discussed below.

In the image storage section 13, the handwritten and input image received by the image receiving section 11 and the hash value generated by the hash value generation section 12 are stored in association with each other.

The hash value receiving section 14 receives the hash value from the terminal device 32 used by the user B, who is chatting with the user A, who uses the terminal device 31, which is the source of the handwritten and input image.

The image retrieving section 15 retrieves the handwritten and input image stored in the image storage section 13 in association with the hash value received by the hash value receiving section 14.

The image distribution section 16 sends the retrieved handwritten and input image to the terminal device 32, which is the source of the hash value received by the hash value receiving section 14. Thereby, the image distribution section 16 displays the handwritten and input image on the terminal device 32 as the message of the user A. That is, the terminal device 32 displays the handwritten and input image on itself in association with the character of the user A present in the currently displayed chat room (chat room in which the character of the user A and the character of the user B are present).

In such a way, the image distribution device 10 can distribute the handwritten message (handwritten and input image) created on the display view of the terminal device 31 by the user A to the terminal device 32 used by the user B who is chatting with the user A, and display the message. As discussed below, the handwritten message (handwritten and input image) created on the display view of the terminal device 31 by the user A is displayed on the terminal device 31 used by the user A in the same manner as the message of the user A.

Figure 3:
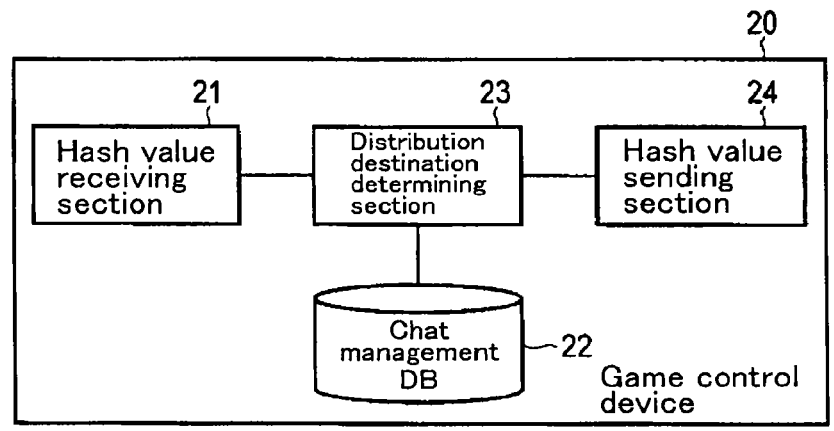
FIG. 3 is a block diagram mainly showing the functional configuration of the game control device 20 shown in FIG. 1.

FIG. 3 is a block diagram mainly showing a functional configuration of the game control device 20 shown in FIG. 1. The game control device 20 provides a network game including a function (chat function) of displaying the chat room in which the character of the user A and the character of the user B are present on the terminal device 31 and the terminal device 32 and letting the user A and the user B chat with each other.

The game control device 20 includes a hash value receiving section 21, a chat management database (DB) 22, a distribution destination determining section 23, and a hash value sending section 24.

The hash value receiving section 21 receives the hash value of the handwritten message (handwritten and input image) created on the display view of the terminal device 31 by the user A and user identifying information (hereinafter, referred to as the user ID) for identifying the user A, who uses the terminal device 31, from the terminal device 31.

In the chat management DB 22, management information for managing the users who are participating in the chat room in the chat system (that is, the users who are chatting) is stored. The management information in the chat management DB 22 includes the user IDs for identifying the users who are participating in the chat room in association with each chat room. Specifically, the management information includes the user ID for identifying the user A and the user ID for identifying the user B are included in association with each other.

The distribution destination determining section 23 determines a distribution destination of the hash value received by the hash value receiving section 21 (hash value of the handwritten and input image) based on the user ID received by the hash value receiving section 21 and the management information stored in the chat management DB 22. In this case, the distribution destination determining section 23 determines the user identified with the user ID, which is included in the management information in the chat management DB 22, in association with the user ID received by the hash value receiving section 21 (that is, the user B, who is chatting with the user A identified with the user ID that has been received by the hash value receiving section 21) as the distribution destination.

The hash value sending section 24 sends the hash value received by the hash value receiving section 21 to the terminal device 32 used by the user B, who has been determined as the distribution destination.

In FIG. 3, the function relating to the chat function is mainly described. However, the game control device 20 also has a function of controlling various network games in general, including, for example, editing of the respective characters of the users and the chat room, and the like.

Hereinafter, operation of the chat system according to the present embodiment will be described. First, the outline of the operation of this chat system will be described.

Figure 4:
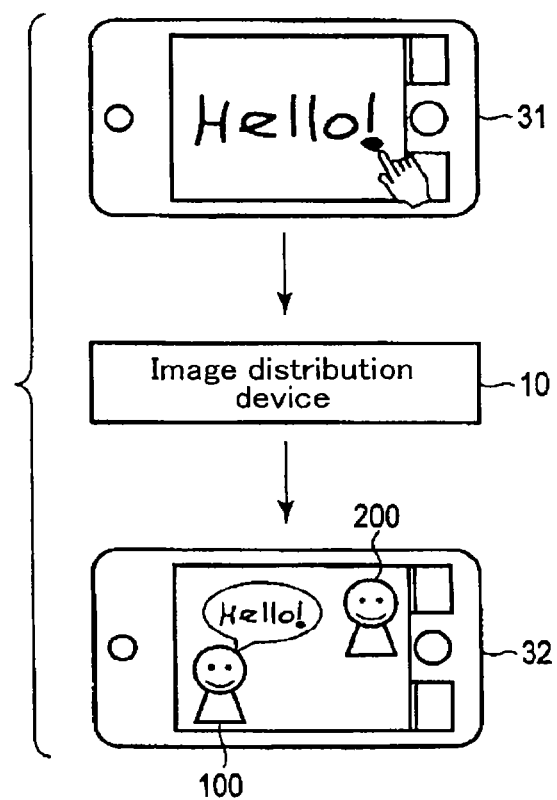
FIG. 4 is a diagram for illustrating an outline of operations of the chat system according to the present embodiment.

As shown in FIG. 4, the user A, who uses the terminal device 31, can input a message by handwriting (here, "Hello!") to the user B on the display view of the terminal device 31 during a chat with the user B, who uses the terminal device 32.

In this case, a handwritten and input image including the message "Hello!" handwritten and input by the user A is distributed to the terminal device 32 used by the user B via the image distribution device 10 (and the game control device 20).

On the display view of the terminal device 32 used by the user B, a character 100 of the user A and a character 200 of the user B (or a chat room in which the characters are present) are displayed.

When the handwritten and input image including the message "Hello!" handwritten and input by the user A is distributed as described above, the handwritten and input image (that is, "Hello!") is displayed on the display view of the terminal device 32 in association with the character 100 of the user A.

With the chat system according to the present embodiment, the user can chat by handwriting in such a way.

Next, with reference to the sequence chart of FIG. 5, a processing procedure of the chat system will be described.

Description will be given in the following on the assumption that the user A, who uses the terminal device 31, and the user B, who uses the terminal device 32, are chatting with each other. That is, it is assumed that, on the terminal device 31 and the terminal device 32, the chat room in which the respective characters of the user A and the user B are present is displayed, so that an environment where the user A and the user B can chat with each other is constructed.

A case where the user A, who uses the terminal device 31, creates a message (comment of the character of the user A) to the user B will be described.

In this case, the user A creates a message by handwriting on the display view of the terminal device 31 displaying the chat room with use of the touch panel of the terminal device 31.

In a case where the handwritten message is created on the display view of the terminal device 31 in such a way, the terminal device 31 retrieves a handwritten and input image including the handwritten message (Step S1).

The terminal device 31 sends the retrieved handwritten and input image to the image distribution device 10 (Step S2). In other words, the terminal device 31 uploads the retrieved handwritten and input image to the image distribution device 10.

Next, the image receiving section 11 in the image distribution device 10 receives the handwritten and input image from the terminal device 31. The hash value generation section 12 generates a hash value of the handwritten and input image received by the image receiving section 11 (Step S3). The hash value of the handwritten and input image is generated based on, for example, a predetermined hash function or the like.

The hash value generated by the hash value generation section 12 is sent to the terminal device 31 (Step S4). The hash value generated by the hash value generation section 12 is stored in the image storage section 13 in association with the handwritten and input image received by the image receiving section 11.

The terminal device 31 receives the hash value (hash value of the handwritten and input image) from the image distribution device 10, and sends the received hash value to the game control device 20 together with the user ID for identifying the user A, who uses the terminal device 31 (Step S5). It is assumed that the user ID is preliminarily held inside the terminal device 31.

The hash value receiving section 21 in the game control device 20 receives the hash value and the user ID from the terminal device 31.

The distribution destination determining section 23 determines, as a distribution destination of the handwritten and input image, the user identified with the user ID, or the user who is chatting with the user A (here, the user B), based on the user ID received by the hash value receiving section 21 and the management information stored in the chat management DB 22 (Step S6). The management information in the chat management DB 22 is information including the respective user IDs for identifying the users who are participating in the chat room in association with each chat room. Thereby, the distribution destination determining section 23 can determine, as the distribution destination, the user identified with the user ID included in the management information in association with the user ID received by the hash value receiving section 21.

Next, the hash value sending section 24 sends the hash value received by the hash value receiving section 21 to the terminal device 32 used by the user B, who has been determined as the distribution destination (Step S7). It is assumed that various types of information required for sending the hash value to the terminal device 32 is preliminarily stored in, for example, the chat management DB 22 or the like.

The terminal device 31 sends the hash value received from the image distribution device 10 to the image distribution device 10 (Step S8). Thereby, the terminal device 31 makes a request to the image distribution device 10 for the handwritten and input image.

The hash value receiving section 14 in the image distribution device 10 receives the hash value from the terminal device 31. The image retrieving section 15 retrieves the handwritten and input image from the image storage section 13 based on the received hash value (Step S9).

The image distribution section 16 sends the handwritten and input image retrieved by the image retrieving section 15 to the terminal device 31 (Step S10).

The terminal device 31 receives the handwritten and input image from (the image distribution section 16 in) the image distribution device 10. On the display view of the terminal device 31, the received handwritten and input image is displayed in association with the character of the user A (Step S11).

It is assumed that the terminal device 31 sends the hash value to the image distribution device 10, the terminal device 31 receives the handwritten and input image associated with the hash value, and then the handwritten and input image is displayed on the terminal device 31 in the above description. However, the present invention is not limited to this. For example, the handwritten and input image may be displayed on the terminal device 31 after sending the handwritten and input image to the image distribution device 10 in Step S2.

Meanwhile, the terminal device 32 receives the hash value sent by the game control device 20 in Step S7. The terminal device 32 sends the received hash value to the image distribution device 10 (Step S12). Thereby, the terminal device 32 makes a request to the image distribution device 10 for the handwritten and input image.

The hash value receiving section 14 in the image distribution device 10 receives the hash value from the terminal device 32. The image retrieving section 15 retrieves the handwritten and input image from the image storage section 13 based on the received hash value (Step S13).

The image distribution section 16 sends the handwritten and input image retrieved by the image retrieving section 15 to the terminal device 32 (Step S14).

The terminal device 32 receives the handwritten and input image from (the image distribution section 16 in) the image distribution device 10. By executing such processing, the terminal device 32 downloads the handwritten and input image from the image distribution device 10.

In this case, on the display view of the terminal device 32, the received handwritten and input image is displayed in association with the character of the user A (Step S15).

In the present embodiment, as described above, the handwritten and input image is once uploaded to the image distribution device 10 and the respective terminal devices 31 and 32 retrieve the handwritten and input image from the image distribution device 10. Thereby, in comparison to, for example, a case where the handwritten and input image is distributed to (the terminal devices used by) the users all at once, the processing is distributed.

The case where the handwritten message is created by the user A has been described. However, the same processing is executed even in a case where a handwritten message is created by the user B. Specifically, in a case where a handwritten message is created by the user B, the processing of the terminal device 31 shown in FIG. 5 may be executed in the terminal device 32 of the user B, and the processing of the terminal device 32 shown in FIG. 5 may be executed in the terminal device 31 of the user A.

By repeating such processing, messages (handwritten and input images) are exchanged between the user A and the user B and the messages are displayed in association with the characters of the user A and the user B. Therefore, the user A and the user B can chat with each other by handwriting.

Figure 5:
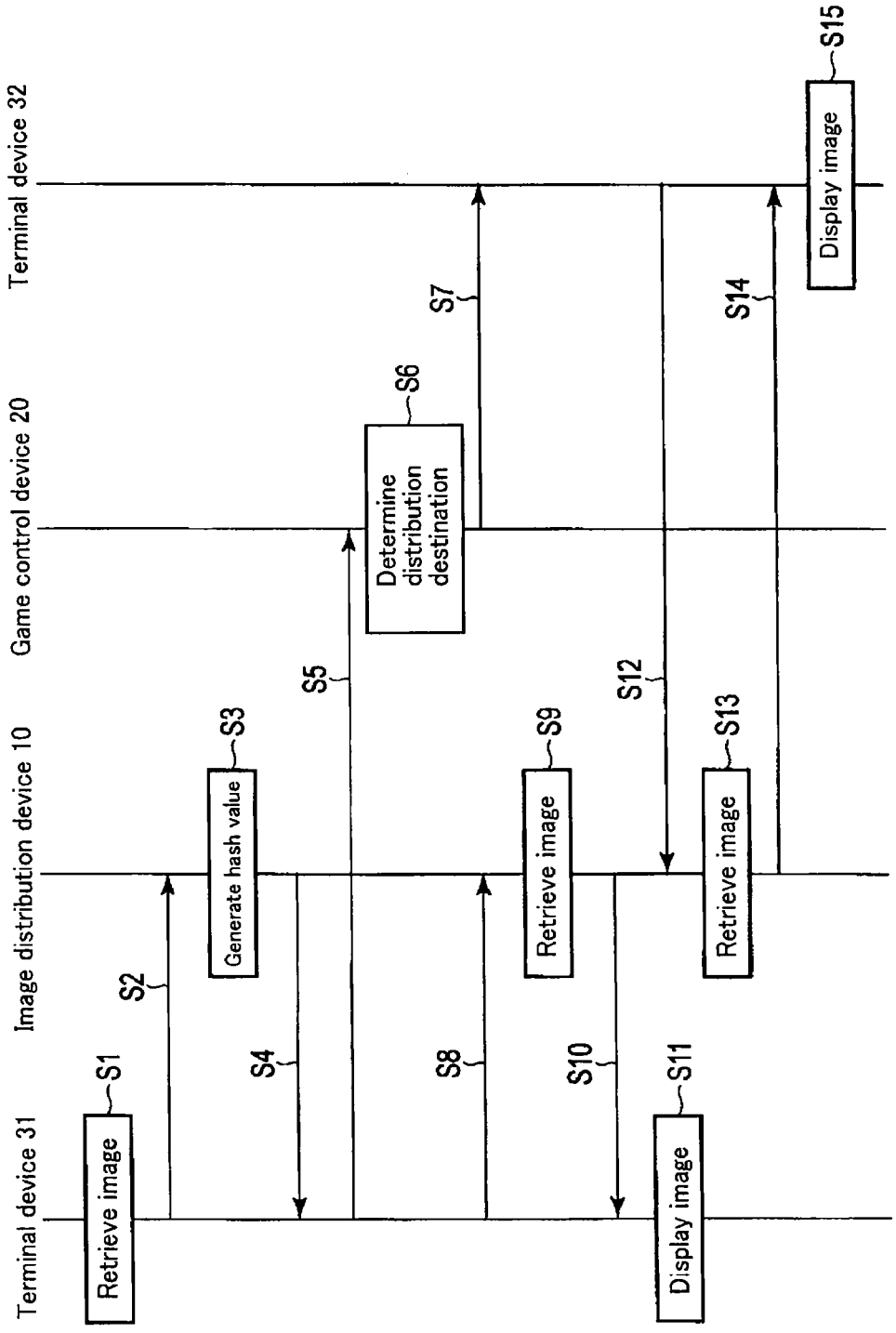
FIG. 5 is a sequence chart showing a processing procedure of the chat system according to the present embodiment.

An administrator of the chat system or the like may carry out an inspection of the handwritten and input images accumulated in the image storage section 13 in the image distribution device 10 using the processing shown in FIG. 5.

With this, for example, a user who may create an inappropriate message such as a message including personal information and the like can be identified. By identifying such a user, messages and the like of the user can be monitored and a measure such as suspension of his/her account can be taken according to need.

Figure 6:
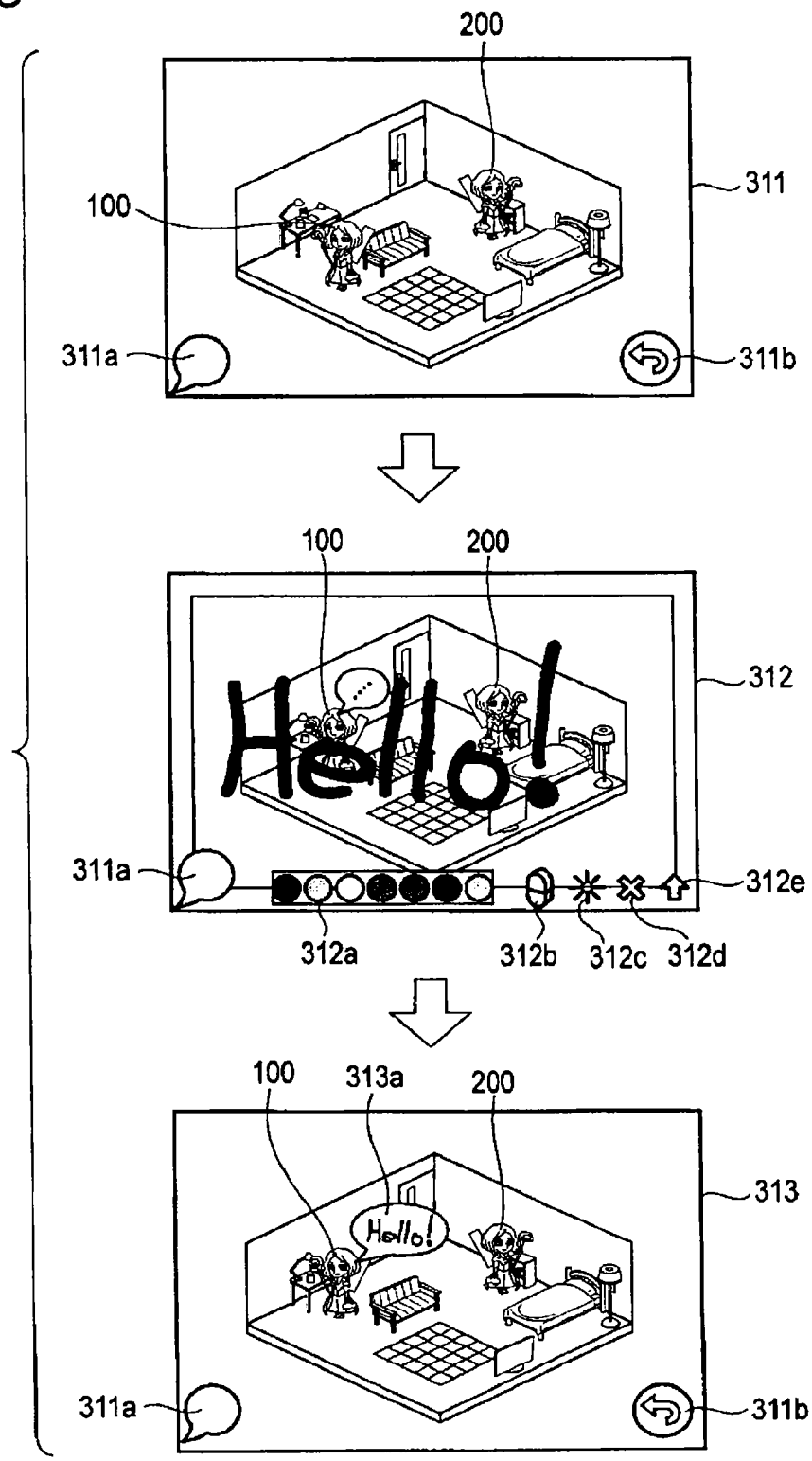
FIG. 6 is a diagram for specifically illustrating a display view of the terminal device 31 used by a user A, who is chatting with a user B.

With reference to FIG. 6, a display view 311 of the terminal device 31 used by the user A, who is chatting with the user B, will be specifically described.

The display view 311 shown in FIG. 6 is one example of the display view of the terminal device 31, for example, at the time of displaying the chat room (virtual space) in which the character 100 of the user A and the character 200 of the user B are present. Here, the character 100 of the user A and the character 200 of the user B are the same characters. However, the character 100 of the user A and the character 200 of the user B are created by the user A and the user B, and thus may be different characters from each other.

On this display view 311 of the terminal device 31, the user A, who uses the terminal device 31, can carry out, for example, such an operation of moving the character 100 of the user A and the like via the touch panel of the terminal device 31.

An input start button 311a, a back button 311b, and the like are provided on the display view 311 of the terminal device 31.

When the input start button 311a is designated on the display view 311, the terminal device 31 switches to a display view (mode) 312, where a handwritten message can be created on the display view 311. Meanwhile, when the back button 311b is designated on the display view 312, the terminal device 31 transitions to the display view 311 displayed before the display view 312.

When the input start button 311a is designated on the display view 311 of the terminal device 31 as described above, the display view 311 of the terminal device 31 transitions to the display view 312 shown in FIG. 6. On this display view 312 of the terminal device 31, as shown in FIG. 6, the user A can create a handwritten message (here, "Hello!") on the display view 312. Even in a case where the user A creates a handwritten message, the status of the character 100 of the user A and the character 200 of the user B (or the chat room in which the characters are present) and the like can be seen on the display view 312 of the terminal device 31.

On this display view 312 of the terminal device 31, a color selection button 312a, a correct button 312b, a delete button 312c, a cancel button 312d, and a send button 312e are provided.

By the color selection button 312a, the color of the handwritten message created by the user A can be selected.

By the correct button 312b, part of the handwritten message created by the user A can be corrected. Specifically, by selecting the correct button 312b on the display view 312 of the terminal device 31 and then designating some region of the message created on the display view 312, the message in the designated region can be deleted.

By the delete button 312c, the entire handwritten message created by the user A can be deleted.

By the cancel button 312d, creation of the message can be cancelled and the screen can be returned to the above display view 311.

By the send button 312e, (the handwritten and input image including) the handwritten message created on the display view 312 of the terminal device 31 by the user A can be sent.

In a case where the handwritten message is created on the display view 312 of the terminal device 31 by the user A and then the send button 312e is designated on the display view 312, by executing the above processing shown in FIG. 5, the display view 312 of the terminal device 31 transitions to a display view 313 shown in FIG. 6.

In this case, as shown on the display view 313 of the terminal device 31 shown in FIG. 6, (a handwritten and input image including) a handwritten message "Hello!" 313a created on the above display view 312 by the user A is displayed in the vicinity of the character 100 of the user A.

In a case where the message is created by the user A as described above, the same display view as the display view 313 of the terminal device 31 shown in FIG. 6 is also displayed on the terminal device 32 used by the user B.

Figure 7:
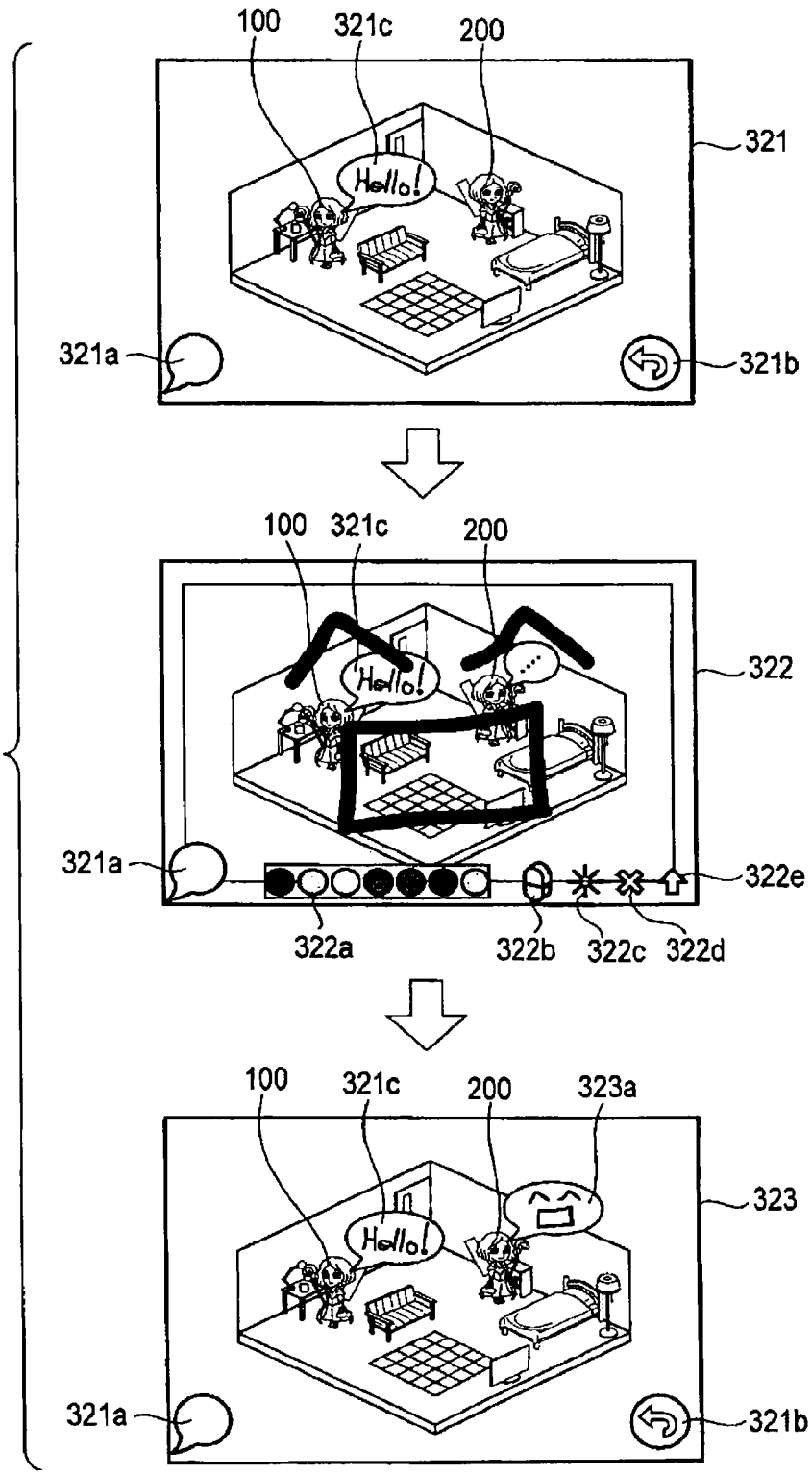
FIG. 7 is a diagram for specifically illustrating a display view of the terminal device 32 used by the user B, who is chatting with the user A.

Next, with reference to FIG. 7, the display view of the terminal device 32 used by the user B, who is chatting with the user A, will be specifically described.

A display view 321 shown in FIG. 7 is one example of the display view of the terminal device 32 at the time of displaying the chat room in which the character 100 of the user A and the character 200 of the user B are present. The character 100 of the user A and the character 200 of the user B (or the chat room in which the characters are present) are the same as those of the character 100 of the user A and the character 200 of the user B (or the chat room in which the characters are present) displayed on the display view of the above terminal device 31.

On the display view 321 of the terminal device 32, the user B, who uses the terminal device 32, can carry out such an operation of moving the character 200 of the user B and the like via the touch panel of the terminal device 32 as well as the display view 311 of the above terminal device 31.

An input start button 321a, a back button 321b, and the like are provided on the display view 321 of the terminal device 32. The input start button 321a and the back button 321b are the same as the above input start button 311a and the back button 311b. Thus, detailed description of the buttons will be omitted.

The display view 321 of the terminal device 32 is assumed to be the display view of the terminal device 32 after the handwritten message is created by the user A as described above. In this case, on the display view 321 of the terminal device 32, (a handwritten and input image including) a handwritten message 321c created by the user A (that is, the same message as the message 313a on the display view 313 shown in FIG. 6) is displayed in the vicinity of the character 100 of the user A.

When the input start button 321c is designated on the display view 321 of the terminal device 32, the display view 321 of the terminal device 32 transitions to a display view 322 shown in FIG. 7. On this display view 322 of the terminal device 32, as shown in FIG. 7, the user B can create a handwritten message on the display view 322, for example, as a reply to the above message of the user A. Even in a case where the user B creates a handwritten message, a status of the character 100 of the user A and the character 200 of the user B (or the chat room in which the characters are present) and the like can be seen on the display view 322 of the terminal device 32.

On this display view 322 of the terminal device 32, a color selection button 322a, a correct button 322b, a delete button 322c, a cancel button 322d, and a send button 322e are provided. The color selection button 322a, the correct button 322b, the delete button 322c, the cancel button 322d, and the send button 322e are the same as the color selection button 312a, the correct button 312b, the delete button 312c, the cancel button 312d, and the send button 312e described in FIG. 6 above. Thus, detailed description of the buttons will be omitted.

In a case where the handwritten message is created on the display view 322 of the terminal device 32 by the user B and then the send button 322e is designated on the display view 322, by executing the above processing shown in FIG. 5, the display view 322 of the terminal device 32 transitions to a display view 323 shown in FIG. 7.

In this case, as shown on the display view 323 of the terminal device 32 shown in FIG. 7, (a handwritten and input image including) a handwritten message 323a created on the above display view 322 by the user B is displayed in the vicinity of the character 200 of the user B.

In a case where the message is created by the user B as described above, the same display view as the display view 323 of the terminal device 32 shown in FIG. 7 is also displayed on the terminal device 31 used by the user A.

In such a way, by creating the handwritten messages by the user A and the user B respectively via the terminal device 31 and the terminal device 32 and displaying the messages on the terminal device 31 and the terminal device 32, the user A and the user B can chat with each other by handwriting.

For example, the sizes of the messages displayed in the vicinity of the character of the user A and the character of the user B on the display views of the terminal device 31 and the terminal device 32 may be changed (for example, reduced) over time, or the messages may be deleted at the time of creating (displaying) a new message, after a predetermined time elapses (for example, after three seconds), or the like.

As described above, in the present embodiment, the handwritten and input image including the trajectory handwritten and input on the display view of the terminal device (first terminal device) 31 displaying the chat room (virtual space) in which the character of the user A (first user) and the character of the user B (second user) are present, by the user A is received from the terminal device 31. The hash value of the received handwritten and input image (identifying information unique to the handwritten and input image) is generated. The received handwritten and input image and the generated hash value are stored in the image storage section 13 in association with each other. The generated hash value is sent to the terminal device (second terminal device) 32. In a case where the hash value sent to the terminal device 32 is received from the terminal device 32, the handwritten and input image stored in the image storage section 13 in association with the received hash value is sent to the terminal device 32. Thereby, on the display view of the terminal device 32 displaying the chat room, the handwritten and input image is displayed in association with the character of the user A present in the chat room. With this configuration, the users can chat with each other by handwriting.

For example, in a case where the terminal device 31 and the terminal device 32 are smartphones each including a touch panel as described above, and in a case of creating a message with use of a keyboard or the like, the keyboard is displayed in, for example, the lower-half region of the smartphone. Therefore, the chatting users cannot see the status of the characters of the respective users and the chat room at the time of creating the message. Meanwhile, in the present embodiment, the handwritten message can be created on the display view displaying the chat room in which the characters of the respective users are present. Thus, the message can be created while seeing the status of the characters of the respective users and the chat room.

In the present embodiment, the description has been made on the assumption that the terminal device 31 and the terminal device 32 are smartphones each including a touch panel. However, the terminal device 31 and the terminal device 32 may be any terminal devices with which the user A and the user B can create handwritten messages. Even in a case where the terminal device 31 and the terminal device 32 do not include a touch panel, the present embodiment can be applied to a configuration in which a handwritten message can be created with use of, for example, a mouse or the like.

In the present embodiment, it is assumed that the users chat with each other by handwriting in the above description. However, the users can select to use, for example, a keyboard or the like to chat with each other. For example, in a case where a message (texts) is created on the terminal device 31 with use of a keyboard or the like, the message may be sent to the terminal device 32 via the game control device 20 without using the above image distribution device 10 and the message may be displayed in association with the character of the user A.

In the present embodiment, it is assumed that two users, or the user A and the user B, chat with each other in the above description. However, even three or more users can chat with each other by handwriting. For example, in a case where the user A, the user B, and a user C chat with each other, and in a case where the user A creates a handwritten message, the hash value of a handwritten and input image including the message may be sent to a plurality of terminal devices used by the user B and the user C, the handwritten and input image may be retrieved from the image distribution device 10 with use of the hash value, and the handwritten and input image may be displayed on the terminal devices.

In the present embodiment, it is assumed that the image distribution device 10 and the game control device 20 are separate devices in the above description. However, the image distribution device 10 and the game control device 20 may be formed as one server device. In this case, for example, in a case where a handwritten and input image is sent from the terminal device 31 used by the user A, the hash value of the handwritten and input image may be respectively sent from the server device to the terminal device 31 and the terminal device 32.

The present invention is not limited to the above embodiment only, but can be embodied by modifying the constituent elements within the scope not departing from the gist thereof on the implementation stage. Various inventions can be formed by appropriately combining the constituent elements disclosed in the above embodiment. For example, some constituent elements may be deleted from all the constituent elements shown in the embodiment. Further, the constituent elements of different embodiments may be appropriately combined.

The invention claimed is:

1. A virtual space distribution method comprising:
   sending, by a server, a shared virtual space to a first terminal device and a second terminal device for display, wherein a first character of a first user of the first terminal device and a second character of a second user of the second terminal device are present in the virtual space;
   in response to a handwritten input being received upon a first display view of a touch panel display of the first terminal device displaying the virtual space, sending, by the server, a first message corresponding to the handwritten input to the first terminal device for display, the handwritten input being input directly on the virtual space displayed in the first display view when the virtual space is displayed in the first display view and the first character of the first user is present in the virtual space; and
   sending, by the server to the second terminal device, the first message corresponding to the handwritten input as a message from the first character to the second character in the virtual space, wherein
   the first message is displayed in the virtual space in positional association with the first character.

2. The virtual space distribution method according to claim 1, wherein
   a size of the first message displayed on the second terminal device changes over time.

3. The virtual space distribution method according to claim 1, wherein
   display of the first message on the second terminal device is ended after a predetermined time elapses.

4. The virtual space distribution method according to claim 1, wherein
   the first display view on the first terminal device showing the first message in the virtual space in positional association with the first character is the same as a second display view on the second terminal device showing the first message in the virtual space in positional association with the first character.

5. A server comprising:
   circuitry configured to
   send a shared virtual space to a first terminal device and a second terminal device for display, wherein a first character of a first user of the first terminal device and a second character of a second user of the second terminal device are present in the virtual space;
   in response to a handwritten input being received upon a first display view of a touch panel display of the first terminal device displaying the virtual space, send a first message corresponding to the handwritten input to the first terminal device for display, the handwritten input being input directly on the virtual space displayed in the first display view when the virtual space is displayed in the first display view and the first character of the first user is present in the virtual space; and
   send, to the second terminal device, the first message corresponding to the handwritten input as a message from the first character to the second character in the virtual space, wherein
   the first message is displayed in the virtual space in positional association with the first character.

6. The server according to claim 5, wherein
   a size of the first message displayed on the second terminal device changes over time.

7. The server according to claim 5, wherein
   display of the first message on the second terminal device is ended after a predetermined time elapses.

8. The server according to claim 5, wherein
   the first display view on the first terminal device showing the first message in the virtual space in positional association with the first character is the same as a second display view on the second terminal device showing the first message in the virtual space in positional association with the first character.

9. A non-transitory computer readable medium storing thereon a program which, when executed by a server, causes the server to:
   send a shared virtual space to a first terminal device and a second terminal device for display, wherein a first character of a first user of the first terminal device and a second character of a second user of the second terminal device are present in the virtual space;
   in response to a handwritten input being received upon a first display view of a touch panel display of the first terminal device displaying the virtual space, send a first message corresponding to the handwritten input to the first terminal device for display, the handwritten input being input directly on the virtual space displayed in the first display view when the virtual space is displayed in the first display view and the first character of the first user is present in the virtual space; and send, to the second terminal device, the first message corresponding to the handwritten input as a message from the first character to the second character in the virtual space, wherein the first message is displayed in the virtual space in positional association with the first character.

10. The non-transitory computer readable medium according to claim 9, wherein a size of the first message displayed on the second terminal device changes over time.

11. The non-transitory computer readable medium according to claim 9, wherein display of the first message on the second terminal device is ended after a predetermined time elapses.

12. The non-transitory computer readable medium according to claim 9, wherein the first display view on the first terminal device showing the first message in the virtual space in positional association with the first character is the same as a second display view on the second terminal device showing the first message in the virtual space in positional association with the first character.

\* \* \* \* \*